July 18, 1944. O. C. KOPPEN 2,353,962
AIRPLANE
Filed July 28, 1943 2 Sheets-Sheet 1

INVENTOR.
Otto C. Koppen
BY
H. F. Kirkpatrick
ATTORNEY

July 18, 1944.  O. C. KOPPEN  2,353,962
AIRPLANE
Filed July 28, 1943  2 Sheets-Sheet 2

INVENTOR.
Otto C. Koppen
BY
H. P. Kirkpatrick
ATTORNEY

Patented July 18, 1944

2,353,962

UNITED STATES PATENT OFFICE 2,353,962

AIRPLANE

Otto C. Koppen, Newton, Mass., assignor to General Aircraft Corporation, Dover, Del., a corporation of Delaware Application July 28, 1943, Serial No. 496,425

15 Claims. (Cl. 244—82)

This invention relates to airplanes and has for its object to provide an improved directionally stable two-control airplane constructed and arranged to be flown by direct manual operation of the ailerons and elevator only, and in which directional control is effected with the aid of an automatically movable rudder or rudders actuated and controlled aerodynamically.

Figure 5:
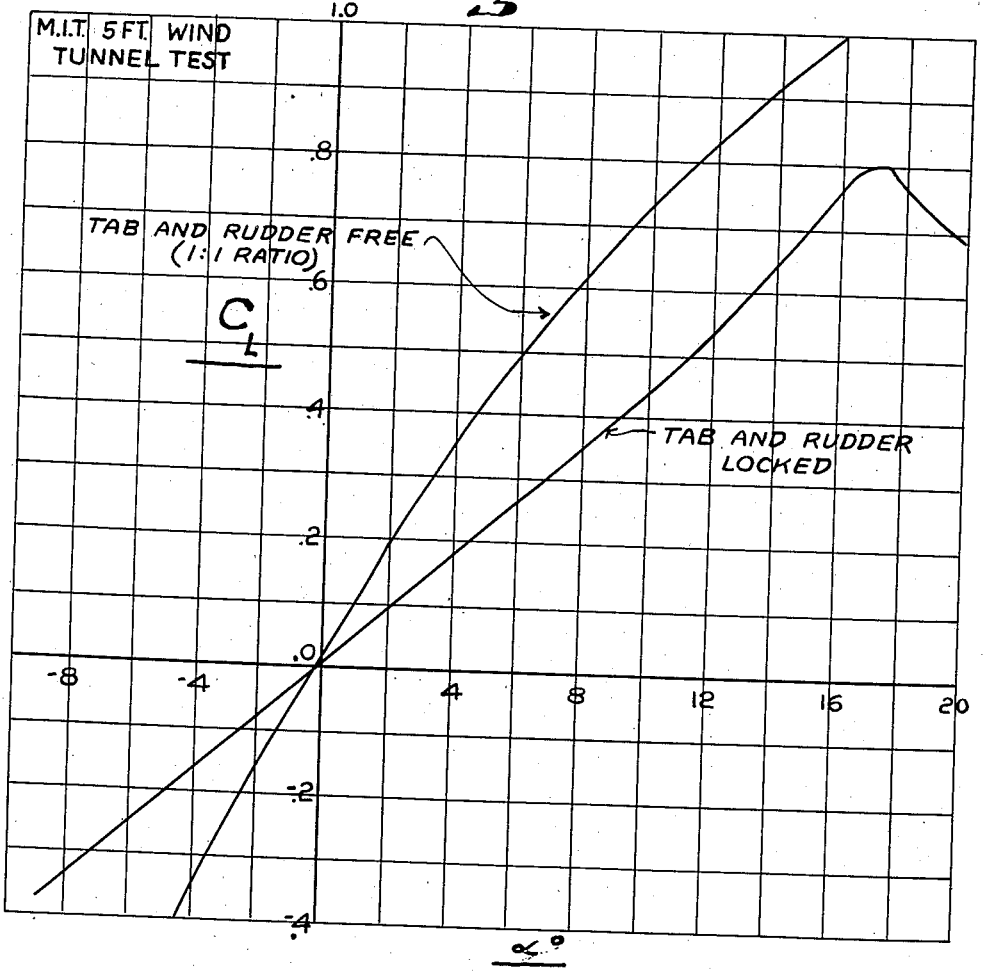

Fig. 5 gives typical tail lift coefficient curves; and

Figure 6:
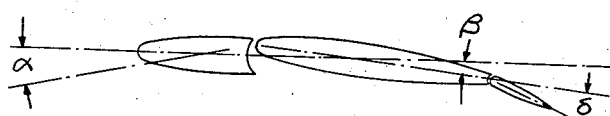

Fig. 6 is a diagram illustrating the movement and effect of said rudder and its tab.

This airplane, as is the airplane of my Patent No. 2,196,994, is capable of satisfying the growing demand for a simplified, more easily controlled and safer airplane which obviates the necessity of the degree of training and skill required to coordinate and synchronize the operation of the three manually operated controls of conventional airplanes, namely, directional (rudder), lateral (ailerons), and longitudinal (elevator), before one is able properly and safely to fly such conventional airplanes. My said patent discloses a rudderless airplane which attains these objects by means including one or more fixed vertical fins of proper size and position as therein described, whereas the airplane of the present invention attains such objects by relatively small automatically movable rudders actuated aerodynamically, with resulting important advantages of smaller size, less weight and drag, more ground clearance, and certain ground handling advantages, particularly with respect to cross-wind taxying, end of landing run, and start of take-off run. In its preferred forms, the airplane of this invention is also non-spinnable, a very substantial and important advantage in civil aircraft intended for and adopted for use by the average man.

This invention provides a successful, simple, two-control airplane which is directionally stable to an exceptional degree in rough, as well as smooth, air; which by aileron control movement only, with the aid of automatically movable rudders, can be smoothly turned, gradually or sharply as required, and safely—even by inexperienced pilots; which does not wallow or swerve from side to side in either straight or turning flight; which has neither material hesitation nor aileron yaw either in initiating or recovering from a turn; and which compensates for damping of yaw in a turn;—all of which desirable characteristics are present whether the airplane be in climbing, cruising, or gliding flight, or whether it be taking off or landing.

Though airplanes controlled by but two manually operated controls for elevator and ailerons with the rudder or rudders tied in with and actuated by the aileron control stick or wheel, along with elevators, are old in the art, the present airplane avoids various structural and aerodynamic disadvantages of a positive linkage between ailerons and rudders and provides instead an automatically movable rudder actuated aerodynamically (and to the proper extent) because of its being directly and automatically responsive to, and controlled by, change in angle of attack of the tail, and with resultant advantages, as hereinafter more fully described.

Referring to the drawings, in which like numbers represent like parts, the airplane has a wing 2, with ailerons 4 and flaps 6, affixed to a fuselage 8 having a propeller 9. To the fuselage 8 are suitably affixed main landing wheels 10 and nose wheel 12, though present-day conventional landing gear with suitable brakes will answer. The fuselage 8 carries at the rear thereof a horizontal stabilizer 14 having hingedly affixed thereto an elevator 16. The ailerons and elevator may be controlled by either a single "stick" or Deperdussin wheel (not shown). The foregoing enumerated elements represent common practice.

Figure 1:
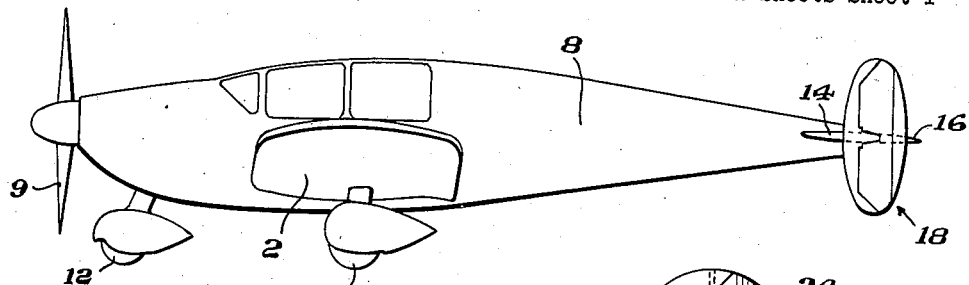
Fig. 1 is a side elevation of an airplane made according to a preferred embodiment of my invention.
Figure 3:
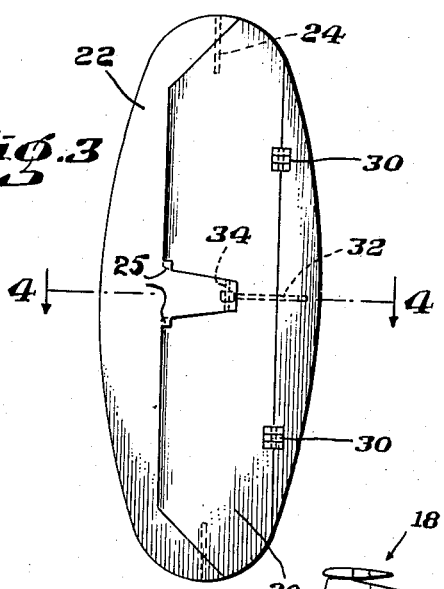
Fig. 3 is an enlarged side elevation of one of the automatically movable rudders of the airplane of Figs. 1 and 2.
Figure 2:
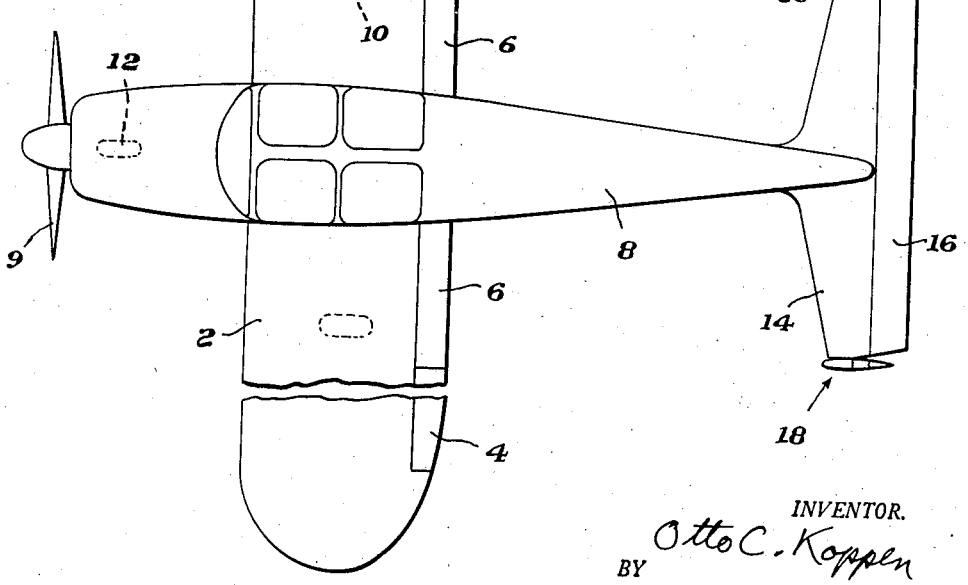
Fig. 2 is a plan view of said airplane.
Figure 4:
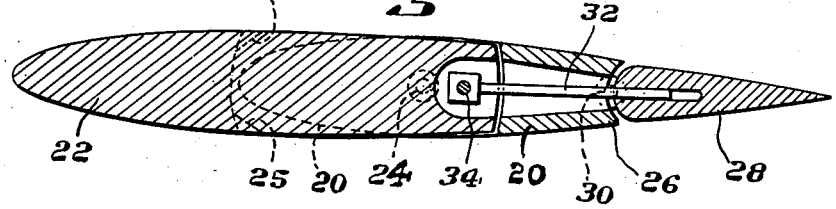
Fig. 4 is a cross-section (partly in plan) taken on line 4—4 of Fig. 3.

The airplane of this invention, in its preferred form, has two vertical tail units, generally designated at 18, mounted at or near the ends of the stabilizer. Each tail unit is made up of a movable rudder portion 20 hingedly mounted on a fixed portion 22 which may be externally and forwardly positioned (as shown) with reference to the movable portion 20, or the fixed portion may be internally positioned with reference to the movable portion 20 and completely housed at or near its pivot and thus serve as a cantilever vertical support. In either case, it is affixed to the stabilizer and serves as a vertical support and bearing on which the movable portion of the rudder is hinged or pivoted at 24 so that the moving portion 20 is aerodynamically overbalanced, as hereinafter described. Preferably, the maximum possible angular movement of rudder is limited by suitable stops 25 so that the movement cannot exceed, say, 10 degrees either side of neutral. Normally the movement does not exceed 6 or 7 degrees in the airplane of the drawings. At the rear edge 26 of said rudder portion 20 is hinged a tab 28 which is mechanically linked to said rudder portion (see Fig. 4) so that as the rear edge of the rudder portion with its hinge 30 is displaced to one side of an aligned longitudinal position, the tab moves about its hinge towards the same side and beyond alignment with the rudder portion 20 as thus moved.

Such movement of the tab 28 about its hinge may be accomplished, for example, by a rod 32 mounted for slidable movement fore and aft in the tab 28, and having its forward end pivoted about a vertical axis 34 at a point rearward of the rudder pivot axis 24. This arrangement as shown causes the tab to always point towards the pivot 34 mounted in the fixed portion 22.

The degree of relative angular movement between the tab 28 and rudder 20 may be adjusted and controlled by adjusting the pivot 34 fore or aft (by suitable means not shown) and thus changing the distance between the axis 24 of the rudder portion and the pivot 34 of the rod 30. In practice, and with the device as shown in the drawings, a 1-to-1 "gearing" of the tab to rudder and the rudder pivot at approximately 40% of the mean chord of the rudder (abaft its leading edge) appear to produce optimum results though it will be evident that the hinge position and tab "gear" ratio may be varied. If the fixed portion be internally positioned, however, the pivot is placed relatively further forward to a position which may be of the order of 30% of the mean chord of the movable rudder.

The invention involves increasing the slope of the tail lift coefficient curve by the use of an aerodynamically overbalanced movable rudder as described, which surface is stabilized by the automatic tab. In flight, when the angle of attack of the movable rudder surface is changed, the aerodynamic overbalance of the rudder at once causes an increase of its angle of attack. The tab linkage to the moving surface is such that its angle of attack also simultaneously increases. Thus, upon a turn being initiated by a manual displacement of the movable control surfaces, the resulting yaw of the airplane causes an increase in the angle of attack of the movable rudder whose lifting and hence turning effectiveness is thereby greatly enhanced, automatically, and to the correct degree. It will be seen that the moment of the tab about its hinge axis or after edge of the rudder opposes the hinge moment of the overbalance of the rudder so that for each angle of attack there can be but one equilibrium position of the rudder. The tab restores the rudder to a neutral trailing position when the angle of attack becomes zero. Figure 5 of the drawings shows a typical tail lift coefficient curve for a tail with the automatically movable rudder of this invention, as described, as compared with a tail lift coefficient curve for the same tail with the rudder and tab locked. The slope of a tail yawing moment coefficient curve depends upon the product of three factors; the tail area ratio, the slope of the lift coefficient curve of the tail, and the ratio of tail length to wing span. In the U. S. National Advisory Committee sign convention employed in this country and used herein, a negative sign of the slope of the tail yawing moment coefficient curve (called in the art "yawing moment curve") indicates directional stability and the airplane of this invention has all the characteristics necessary for successful and easily controlled flight, both straight and turning, when the negative slope or tangent of the line of the yawing moment curve is of the order of $-.0020$ per degree of angle of yaw, with an optimum of the order of $-.0027$ to $-.0030$ per degree, though full benefits from the standpoints of stability, turning and control can be obtained with a yawing moment curve having a slope in excess of said optimum but with some limitations on account of considerations of additional weight, size and expense.

Stated mathematically, the slope of the tail yawing moment curve is $$\frac{dC_n}{d\psi} = \left(\frac{dC_L}{d\alpha}\right)'' \frac{S''}{S} \frac{l}{b}$$

where $$\frac{dC_n}{d\psi}$$

is the slope of the yawing moment curve $S''$ is the vertical tail area
$S$ is the wing area
$l$ is the tail length
$b$ is the wing span.

It should be noted that the slope of the tail yawing moment coefficient curve, $$\left(\frac{dC_n}{d\psi}\right)$$

depends upon the product of $$\left(\frac{dC_L}{d\alpha}\right)''$$

and $S''$, and consequently any increase in either factor can be compensated by a proportionate decrease in the other. Thus the required slope of the tail yawing moment may be secured with this relatively small tail of steep slope of lift characteristics.

The angle of equilibrium of the automatically movable rudder may be expressed as follows:

$$\frac{\partial C_H}{\partial \alpha}\alpha + \frac{\partial C_H}{\partial \beta}\beta + \frac{\partial C_H}{\partial \delta}\delta = 0$$

where $$\frac{\partial C_H}{\partial \alpha}$$

is the variation of hinge moment with angle of attack of the whole surface $$\frac{\partial C_H}{\partial \beta}$$

is the variation of hinge moment with deflection of the surface $$\frac{\partial C_H}{\partial \delta}$$

is the variation of hinge moment coefficient with tab angle.

The angles $\alpha$, $\beta$, and $\delta$ are defined according to Fig. 6.

Since there is a fixed linkage or "gearing" between the moving surface and the tab, the tab angle, $\delta$, may be expressed as $$\delta = K\beta$$

The hinge moment expression then becomes:

$$\frac{\partial C_H}{\partial \alpha}\alpha + \frac{\partial C_H}{\partial \beta}\beta + \frac{\partial C_H}{\partial \delta}K\beta = 0 \quad (1)$$

or $$\beta = -\frac{\frac{\partial C_H}{\partial \alpha}\alpha}{\frac{\partial C_H}{\partial \beta} + K\frac{\partial C_H}{\partial \delta}} \quad (2)$$

and the variation of the angle of the moving portion with angle of attack is:

$$\frac{\partial \beta}{\partial \alpha} = -\frac{\frac{\partial C_H}{\partial \alpha}}{\frac{\partial C_H}{\partial \beta} + K\frac{\partial C_H}{\partial \delta}} \quad (3)$$

The design is such that the overbalance provides that $$\frac{\partial \beta}{\partial \alpha}$$

be positive. The effective slope of the lift curve then becomes:

$$\frac{\partial C_L}{\partial \alpha} = \left(\frac{\partial C_L}{\partial \alpha}\right)_0 \left[1 + \frac{\partial C_L}{\partial \beta}\frac{\partial \beta}{\partial \alpha}\right] \quad (4)$$

where $$\frac{\partial C_L}{\partial \alpha}$$

is the slope of the lift coefficient curve with movable portion in operation $$\left(\frac{\partial C_L}{\partial \alpha}\right)_0$$

is the slope of the lift curve of a rigid airfoil of the same shape as the tail in question $$\frac{\partial C_L}{\partial \beta}$$

is the variation of lift coefficient with angle $\beta$ (Fig. 6)

$$\frac{\partial \beta}{\partial \alpha}$$

is the variation of movable surface angle with angle of attack (Expression 3).

For the purpose of illustrating the invention, the drawings show a typical preferred embodiment in a small single-propeller, low wing monoplane with tricycle landing gear. Though the invention is here shown only in connection with a small single propeller airplane, it is applicable to both single and multi-propeller airplanes of various types and sizes. Also, though the invention has been described only in connection with airplanes having rearwardly extending means for supporting tail portions (such as a fuselage or booms), the principles of the invention are also applicable to tailless airplanes in which the wings are swept back sufficiently so that the necessary vertical or angularly disposed tail surfaces may be affixed at or near the ends of the wings and rearwardly of the center of gravity. Also, in such airplanes, the ailerons may serve as both pitching and rolling control means for longitudinal and lateral control.

There may be a single rudder or a plurality of rudders, as shown, provided it or they are so supported and placed outside the propeller slip stream (which is ordinarily about nine-tenths of the propeller diameter) as to avoid the turning and rolling effect of slip stream rotation. If there are several rudders they must be spaced sufficiently far apart to avoid interference with each other.

This invention provides an airplane which, as a practical matter and in all normal conditions of flight, will maintain a substantially zero angle of yaw. Thus, it will maintain straight flight or turning flight, as the case may be, when the ailerons are in neutral, but also properly turn or straighten from a turn, as the case may be, when the ailerons are displaced from neutral, the elevator being applied according to the required wing lift.

Having described my invention and typical preferred embodiment thereof, I claim:

1. In a two-control airplane constructed and arranged to be flown by direct manual operation of ailerons and elevators only, a supporting wing, ailerons on the wing, a fuselage having a nose, body, tail portions, a stabilizer and elevator mounted on the rear end of the fuselage, and laterally spaced vertical rudders each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a neutral trailing position when the angle of attack becomes zero, the length of said tail portion and the aggregate lift of said movable rudders and tabs being such as with the aforesaid related elements of the airplane to provide a stable yawing moment curve.

2. In a two-control airplane constructed and arranged to be flown by direct manual operation of ailerons and elevators only, a supporting wing, ailerons on the wing, a fuselage having a nose, body, tail portions, a stabilizer and elevator mounted on the rear end of the fuselage, and laterally spaced vertical rudders each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a neutral trailing position when the angle of attack becomes zero, the length of said tail portion and the aggregate lift of said movable rudders and tabs being such as with the aforesaid related elements of the airplane to provide a stable yawing moment curve having a slope in excess of minus .0020 per degree of angle of yaw.

3. In a two-control airplane constructed and arranged to be flown by direct manual operation of ailerons and elevators only, a supporting wing, ailerons on the wing, a fuselage having a nose, body, tail portions, a stabilizer and elevator mounted on the rear end of the fuselage, and laterally spaced vertical rudders each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a neutral trailing position when the angle of attack becomes zero, the length of said tail portion and the aggregate lift of said movable rudders and tabs being such as with the aforesaid related elements of the airplane to provide a stable yawing moment curve having a slope of the order of minus .0025 to minus .0030 per degree of angle of yaw.

4. In a two-control airplane constructed and arranged to be flown by direct manual operation of ailerons and elevators only, a supporting wing, ailerons on the wing, a fuselage having a nose, body, tail portions, a stabilizer and elevator mounted on the rear end of the fuselage, laterally-spaced vertical rudder support members, rudders mounted rearwardly of and pivoted on said members, respectively, and movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack becomes zero, the length of said tail portion and aggregate lift of said vertical members, movable rudders and tabs being such as with the aforesaid related elements of the airplane to provide a stable yawing moment curve.

5. In a two-control airplane constructed and arranged to be flown by direct manual operation of ailerons and elevators only, a supporting wing, ailerons on the wing, a fuselage having a nose, body, tail portions, a stabilizer and elevator mounted on the rear end of the fuselage, laterally-spaced vertical rudder support members, rudders mounted rearwardly of and pivoted on said members, respectively, and movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack becomes zero, the length of said tail portion and aggregate lift of said vertical members, movable rudders and tabs being such as with the aforesaid related elements of the airplane to provide a stable yawing moment curve having a slope in excess of minus .0020 per degree of angle of yaw.

6. In a two-control airplane constructed and arranged to be flown by direct manual operation of ailerons and elevators only, a supporting wing, ailerons on the wing, a fuselage having a nose, body, tail portions, a stabilizer and elevator mounted on the rear end of the fuselage, laterally-spaced vertical rudder support members, rudders mounted rearwardly of and pivoted on said members, respectively, and movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack becomes zero, the length of said tail portion and aggregate lift of said vertical members, movable rudders and tabs being such as with the aforesaid related elements of the airplane to provide a stable yawing moment curve having a slope of the order of minus .0025 to minus .0030 per degree of angle of yaw.

7. In a two-control airplane constructed and arranged to be flown by direct manual operation of pitching and rolling control means only, a body, a supporting wing, ailerons on the wing, and laterally-spaced vertical rudders mounted rearwardly of the center of gravity of the airplane, each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack is zero, the aggregate lift of said movable rudders and tabs and the distance thereof from the center of gravity being such as with the aforesaid related elements of the airplane to provide a stable yawing moment curve.

8. In a two-control airplane constructed and arranged to be flown by direct manual operation of pitching and rolling control means only, a body, a supporting wing, ailerons on the wing, and laterally-spaced vertical rudders mounted rearwardly of the center of gravity of the airplane, each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one.

side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack is zero, the aggregate lift of said movable rudders and tabs and the distance thereof from the center of gravity being such as with the aforesaid related elements of the airplane to provide a stable yawing moment curve having a slope in excess of minus .0020 per degree of angle of yaw.

9. In a two-control airplane constructed and arranged to be flown by direct manual operation of pitching and rolling control means only, a body, a supporting wing, ailerons on the wing, and laterally-spaced vertical rudders mounted rearwardly of the center of gravity of the airplane, each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack is zero, the aggregate lift of said movable rudders and tabs and the distance thereof from the center of gravity being such as with the aforesaid related elements of the airplane to provide a stable yawing moment curve having a slope of the order of minus .0025 to minus .0030 per degree of angle of yaw.

10. In a two-control airplane constructed and arranged to be flown by direct manual operation of pitching and rolling control means only, a body, a supporting wing, ailerons on the wing, and laterally-spaced vertical rudder support members, rudders mounted rearwardly of and pivoted on said members and mounted rearwardly of the center of gravity of the airplane, each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack is zero, the aggregate lift of said movable rudders and tabs and the distance thereof from the center of gravity being such as with the aforesaid related elements of the airplane to provide a stable yawing moment curve.

11. In a two-control airplane constructed and arranged to be flown by direct manual operation of pitching and rolling control means only, a body, a supporting wing, ailerons on the wing, and laterally-spaced vertical rudder support members, rudders mounted rearwardly of and pivoted on said members and mounted rearwardly of the center of gravity of the airplane, each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a normal trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack is zero, the aggregate lift of said movable rudders and tabs and the distance thereof from the center of gravity being such as with the aforesaid related elements of the airplane to provide a stable yawing moment curve having a slope of the order of minus .0025 to minus .0030 per degree of angle of yaw.

12. In a two-control airplane constructed and arranged to be flown by direct manual operation of pitching and rolling control means only, a body, a supporting wing, ailerons on the wing, and laterally-spaced vertical rudder support members, rudders mounted rearwardly of and pivoted on said members and mounted rearwardly of the center of gravity of the airplane, each movable about a vertical axis sufficiently rearward of the leading edge of said rudders as to render them aerodynamically unstable, each of said rudders having hingedly attached thereto at the rearward portion thereof a movable tab linked to a fixed portion of the airplane so that in flight when each rudder is displaced by an increased angle of attack and the rear edge thereof departs angularly to one side of a normal trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack is zero, the aggregate lift of said movable rudders and tabs and the distance thereof from the center of gravity being such as with the aforesaid related elements of the airplane to provide a stable yawing moment curve having a slope in excess of minus .0020 per degree of angle of yaw.

13. In a two-control airplane constructed and arranged to be flown by direct manual operation of ailerons and elevators only, a supporting wing, ailerons on the wing, tail group supporting means, a tail group including an elevator, and at least one vertical rudder movable about a vertical axis sufficiently rearward of the leading edge of said rudder as to render it aerodynamically unstable, said rudder having hingedly attached thereto at the rearward portion thereof a movable tab linked to a fixed portion of the airplane so that in flight when said rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack becomes zero, the length of said tail group supporting means and the lift of the movable rudder and the tab surfaces being such as with the aforesaid related elements of the airplane to provide a stable yawing moment curve.

14. In a two-control airplane constructed and arranged to be flown by direct manual operation of ailerons and elevators only, a supporting wing, ailerons on the wing, tail group supporting means, a tail group including an elevator, and at least one vertical rudder movable about a vertical axis sufficiently rearward of the leading edge of said rudder as to render it aerodynamically unstable, said rudder having hingedly attached thereto at the rearward portion thereof a movable tab linked to a fixed portion of the airplane so that in flight when said rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack becomes zero, the length of said tail group supporting means and the lift of the movable rudder and the tab surfaces being such as with the aforesaid related elements of the airplane to provide a stable yawing moment curve having a slope in excess of minus .0020 per degree of angle of yaw.

15. In a two-control airplane constructed and arranged to be flown by direct manual operation of ailerons and elevators only, a supporting wing, ailerons on the wing, tail group supporting means, a tail group including an elevator, and at least one vertical rudder movable about a vertical axis sufficiently rearward of the leading edge of said rudder as to render it aerodynamically unstable, said rudder having hingedly attached thereto at the rearward portion thereof a movable tab linked to a fixed portion of the airplane so that in flight when said rudder is displaced by an increased angle of attack and the rear edge thereof departs angularly to one side of a neutral trailing position, the trimming tab thereof is angularly displaced outwardly with respect to said rudder and progressively towards the same side to an extent sufficient to maintain its rudder in equilibrium at the existing angle of attack and to restore its rudder to a substantially neutral trailing position when the angle of attack becomes zero, the length of said tail group supporting means and the lift of the movable rudder and the tab surfaces being such as with the aforesaid related elements of the airplane to provide a stable yawing moment curve having a slope of the order of minus .0025 to minus .0030 per degree of angle of yaw.

OTTO C. KOPPEN.